Figure 1:
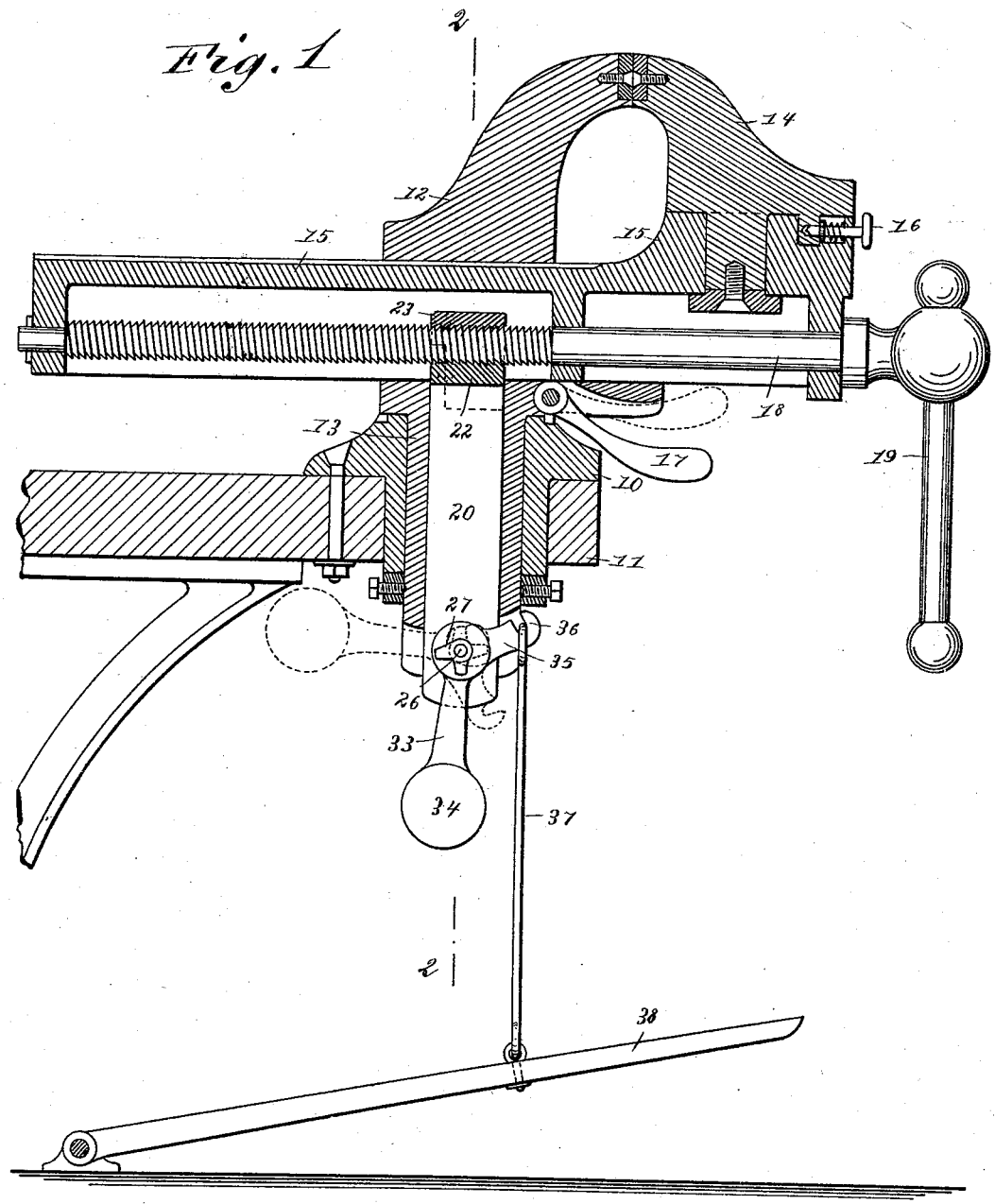

(No Model.) 2 Sheets—Sheet 1.

J. E. BOEGEN.
SECTIONAL NUT.

No. 543,205. Patented July 23, 1895.

WITNESSES:
C. Neveux
W. P. Hutchinson

INVENTOR
J. E. Boegen
BY
Munn & Co
ATTORNEYS.

(No Model.) 2 Sheets—Sheet 2.
J. E. BOEGEN.
SECTIONAL NUT.
No. 543,205. Patented July 23, 1895.
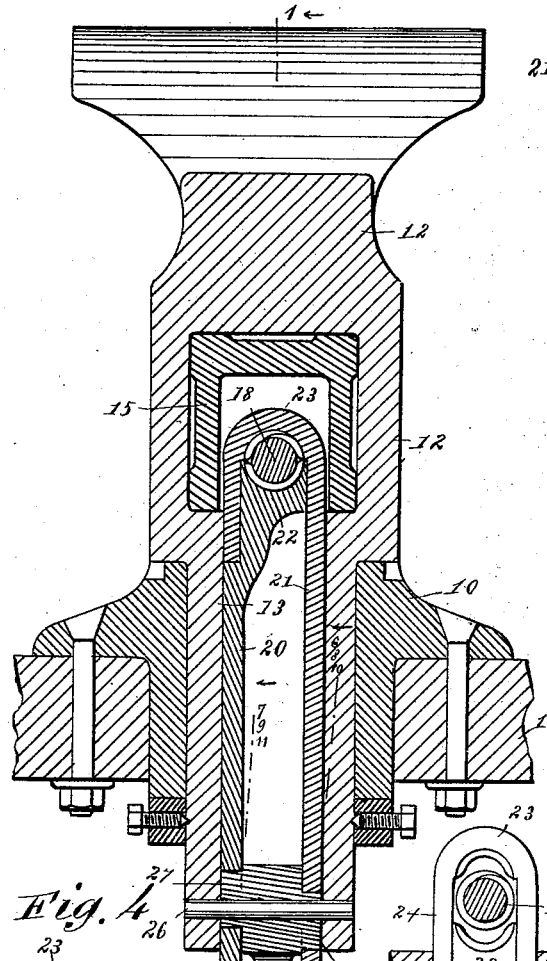
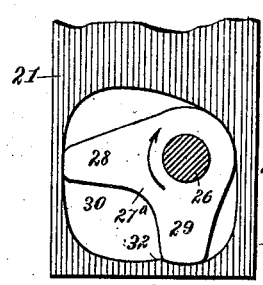
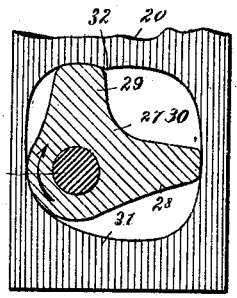
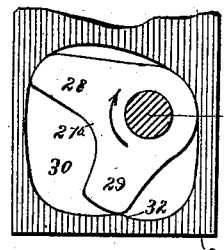
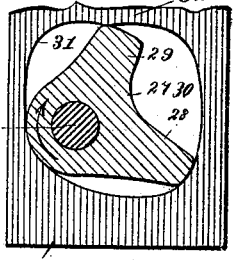
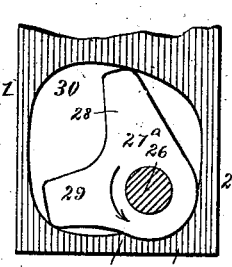
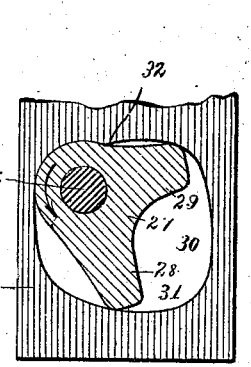
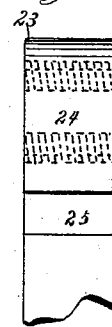
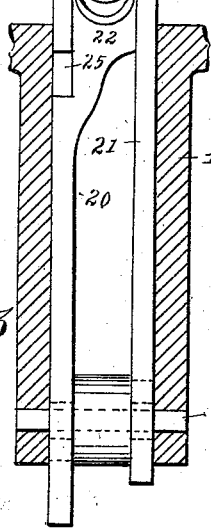
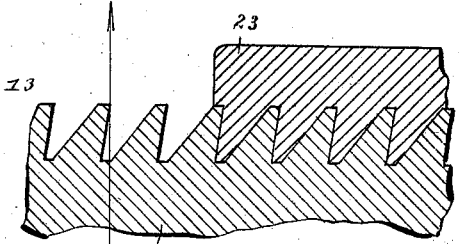
WITNESSES:
C. Neveux
W. B. Hutchinson
INVENTOR
J. E. Boegen
BY
Munn & Co
ATTORNEYS.

UNITED STATES PATENT OFFICE.

JOHN E. BOEGEN, OF SOUTH BAY CITY, MICHIGAN.

SECTIONAL NUT.

SPECIFICATION forming part of Letters Patent No. 543,205, dated July 23, 1895.

Application filed October 19, 1894. Serial No. 526,378. (No model.)

*To all whom it may concern:*

Be it known that I, JOHN E. BOEGEN, of South Bay City, in the county of Bay and State of Michigan, have invented a new and Improved Sectional Nut, of which the following is a full, clear, and exact description.

My invention relates to improvements in two-part nuts, and particularly to such as are applicable to vises, although the nut may be used in connection with anything having oppositely-arranged parts or jaws, one or both of which are moved by a screw.

The object of my invention is to produce a nut and accessory mechanism constructed in a simple, strong, and inexpensive manner, and in such a way that the two parts of the nut, when clamped to the screw, form practically a solid nut, which enables the nut and connected parts to be moved by the turning of the screw, but which also enables the nut to be easily thrown open and released from the screw, so that the part moved by the screw may be approximately adjusted with great speed by sliding it freely on the screw, while again by throwing the nut and screw into engagement the part carried by the screw may be firmly tightened.

A further object of my invention is to produce a nut which is self-locking—that is, which automatically engages the screw and moves it so tightly that it cannot be accidentally displaced.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a vertical section on the line 1 1 of Fig. 2 of a vise provided with my improved sectional nut. Fig. 2 is a cross-section on the line 2 2 of Fig. 1. Fig. 3 is a detail sectional view showing the nut released from the screw. Fig. 4 is a broken side elevation of the upper end of the nut. Fig. 5 is a detail sectional view showing the pitch of the screw which actuates the nut. Fig. 6 is a sectional view on the line 6 6 of Fig. 2, showing the position of one side of the nut when the nut is locked. Fig. 7 is a similar view on the line 7 7 of Fig. 2, showing the position of the other side of the nut when it is locked. Fig. 8 is a section on the line 8 8 of Fig. 2, showing one side of the nut in unlocked position. Fig. 9 is a section on the line 9 9 of Fig. 2, showing the opposite side of the nut in an unlocked position. Fig. 10 is a section on the line 10 10 of Fig. 2, showing one side of the nut when thrown wide open; and Fig. 11 is a section on the line 11 11 of Fig. 2, showing the opposite side of the nut in its wide-open position.

I have illustrated my improved nut as applied to a vise, but it may be applied to other screw-operated things, and, as shown, the vise forms no part of the invention, but it will be preferably described in order that the operation of the nut may be clearly understood.

The vise is provided with a suitable base-ring 10, which is fastened in the usual way to a bench 11, and which supports the fixed jaw 12 of the vise, this having a hollow shank 13, which extends down into the base-ring 10. Opposite the jaw 12 is the movable or sliding jaw 14, which is swiveled to one end of the shank 15, which slides back and forth in the jaw 12, as shown clearly in Figs. 1 and 2, and the jaw 14 is held to the shank 15 by a spring-catch 16. The jaw 12 is fastened to the base-ring 10 by a pawl 17. The shank 15 is provided with the longitudinal screw 18, which has the customary handle-lever 19 at one end, and the screw is of the usual kind, except that its threads, when viewed in cross-section, (see Fig. 5,) are flat at the outer edge and are inclined on one side, so as to have a tendency to hug the similarly-shaped threads of the nut. The nut embodying my invention is formed of two oppositely-arranged parts 20 and 21, which are held in the hollow shank of the jaw 12, and the part 20 at its upper end is provided with a thickened threaded jaw 22 to fit the under side of the screw 18, while the part 21 extends upward and has a top jaw 23, which is also adapted to fit the screw 18, and the jaws or parts 22 and 23 thus completely encircle the screw, so that they have a perfect grip on it. The jaw 23 has a depending lug 24, which is adapted to fit a recess 25 in the upper side of the part 20 of the nut, as shown best in Fig. 4, and thus when the jaw 23 is forced down and the jaw 22 is forced up the two parts of the nut interlock and a strong connection is made.

The nut is supported on a pin 26, which extends through both sides of the nut and into the opposite sides of the shank 13 of the jaw 12, as shown clearly in Fig. 2, and this pin forms the fulcrum of the lever which operates the nut. The opposite sides of the nut are raised and lowered by means of the bell-crank-shaped cams 27 and 27ª, which are provided with arms 28 and 29 and turn on the pin 26, and turn in cam-slots 30 in the side pieces or parts 20 of the nut. These cams are oppositely arranged, so that when the lever which carries them is turned in one direction one cam will move so as to throw its side piece downward, while the other will move so as to throw its side piece upward.

Each cam-slot 30 has on one wall a shoulder 32, which is adapted to engage the arm 29 of the cam 27 or 27ª, so as to hold the cam and nut in locked position, and on the side piece 20 this shoulder is at the top of the cam-slot, while on the side piece 21 the shoulder is at the bottom of the cam-slot. The cams and slots are well adapted for moving and locking the side pieces, but it will be understood that the form of the cams and slots may be changed without affecting the principle of my invention.

The cams 27 and 27ª are secured to and preferably formed integral with a lever 33, which is fulcrumed on the pin 26 and is at one end provided with a weight 34, which normally swings the cams to the position shown in Figs. 6 and 7, thus moving the jaws of the nut into engagement with the screw 18 and throwing the arms 29 of the cams behind the shoulders 32, so as to securely lock the nut. The lever 33 has also a forwardly and outwardly projecting arm 35, which terminates in a hook 36 adapted to engage a connecting-rod 37, by which it connects with a treadle 38, and by stepping on the treadle the lever 33 is tilted, the weight 34 raised, and the cams 27 and 27ª moved to the position shown in Figs. 10 and 11, so as to separate the jaws 22 and 23 of the nut and entirely release the nut from the screw. When the treadle is stepped on and the nut released from the screw, as described, the jaw 14 may be pushed freely back and forth, the shank 15 sliding through the jaw 12, and thus the vise may be quickly adjusted to an approximate degree, and then, by releasing the treadle, the weight 34 drops and again throws the nut into engagement with the screw, so that the handle-lever 19 may be turned and the vise tightened in the usual manner.

The nut is shown applied to the screw or vise, but it will be readily seen from the foregoing description that it may be used in connection with any screw working oppositely-arranged parts, and that the treadle may be dispensed with and the lever 33 worked by hand, if desired.

Having thus described my invention, I claim as new and desire to secure by Letters Patent—

1. A sectional nut comprising sections having opposite threaded jaws at one end and cam slots at the other end, oppositely arranged cams one in each slot and normally bearing at diametrically opposite points in the respective cam slots, said bearing points being aligned with the longitudinal axis of the nut, said cams being adapted when turned, to bear on the cam surfaces in the slots at points diametrically opposite to the points at which they bear normally, and means for rotating said cams, substantially as set forth.

2. A sectional nut comprising sections having oppositely threaded jaws and each provided with a cam slot, oppositely arranged cams, one in each cam slot, each of said cams having two bearing points located at quadrants to one another, each of said points being arranged diametrically opposite to a similar point on the other cam, and means for simultaneously turning each of said cams one-fourth of a rotation, substantially as set forth.

3. A sectional nut comprising sections having oppositely arranged threaded jaws and each provided with a cam slot, a pivot pin extending through said slots, a lever fulcrumed on the pivot pin, and having at one end a weight, cams on the pivot pin, one in each slot, each of said cams having two bearing points located at quadrants to one another, each of said points being arranged diametrically opposite to a similar point on the other cam, a treadle connected to the end of the lever opposite the weighted end thereof, and a stop to limit the throw of the lever, substantially as set forth.

4. A sectional nut comprising sections having oppositely arranged threaded jaws, means for moving said jaws toward and from one another, and means for automatically locking said jaws together when in their extreme positions, substantially as set forth.

5. A sectional nut comprising sections having opposite threaded jaws each provided with a cam slot, oppositely arranged cams, one in each cam slot, means for rotating said cams, whereby the sections may be moved toward and from one another, said cams being adapted to lock the respective sections against movement when in their extreme positions, substantially as set forth.

JOHN E. BOEGEN.

Witnesses:
HENRY HOUCK,
THEODORE TRUDELL.